(12) United States Patent
Pavlou et al.

(10) Patent No.: US 10,466,811 B2
(45) Date of Patent: Nov. 5, 2019

(54) CONTROLLING A LOCAL APPLICATION RUNNING ON A USER DEVICE THAT DISPLAYS A TOUCHSCREEN IMAGE ON A TOUCHSCREEN VIA MOUSE INPUT FROM EXTERNAL ELECTRONIC EQUIPMENT

(71) Applicant: Citrix Systems, Inc., Fort Lauderdale, FL (US)

(72) Inventors: Chris Pavlou, Boca Raton, FL (US); Mukund Ingale, Pompano Beach, FL (US); Georgy Momchilov, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/453,499

(22) Filed: Mar. 8, 2017

(65) Prior Publication Data

US 2017/0336884 A1 Nov. 23, 2017

Related U.S. Application Data

(63) Continuation-in-part of application No. 15/160,047, filed on May 20, 2016.

(51) Int. Cl.
| | | |
|---|---|---|
| *G06F 3/0354* | (2013.01) | |
| *G06F 3/041* | (2006.01) | |
| *G06F 3/0488* | (2013.01) | |
| *G06F 3/038* | (2013.01) | |

(52) U.S. Cl.
CPC .......... *G06F 3/03543* (2013.01); *G06F 3/038* (2013.01)

(58) Field of Classification Search
CPC ..... G06F 3/03543; G06F 3/041; G06F 3/0488
See application file for complete search history.

(56) References Cited

U.S. PATENT DOCUMENTS

| | | |
|---|---|---|
| 9,110,581 B2 | 8/2015 | Momchilov |
| 9,152,436 B2 | 10/2015 | Momchilov |
| 9,514,507 B2 | 12/2016 | McKenzie et al. |
| 9,588,637 B2 | 3/2017 | Momchilov et al. |
| 9,729,520 B2 | 8/2017 | Barton et al. |
| 9,736,221 B2 | 8/2017 | Momchilov et al. |

(Continued)

OTHER PUBLICATIONS

CN102778966A_ENG_Espacenet.pdf ; Espacenet machine translation of Chinese patent publication CN102778966A, published Nov. 14, 2012. Inventor: Liao, Tiansu.*

(Continued)

*Primary Examiner* — Wing H Chow
(74) *Attorney, Agent, or Firm* — BainwoodHuang

(57) ABSTRACT

A technique controls operation of a local application running on a user device (e.g., a smart phone, a tablet, a personal digital assistant, etc.). The technique involves receiving, by the user device, mouse input from external electronic equipment communicating with the user device. The user device has a touchscreen that displays a touchscreen image of the local application. The mouse input indicates user operation of a hardware mouse. The technique further involves translating, by the user device, the mouse input into translated touchscreen input. The technique further involves providing, by the user device, the translated touchscreen input to the local application running on the user device to operate the local application.

20 Claims, 11 Drawing Sheets

(56) References Cited

U.S. PATENT DOCUMENTS

| | | | |
|---|---|---|---|
| 9,760,724 B2 | 9/2017 | Frost | |
| 2006/0195637 A1* | 8/2006 | Zhang | G09G 5/003 |
| | | | 710/72 |
| 2008/0174570 A1* | 7/2008 | Jobs | G06F 3/0488 |
| | | | 345/173 |
| 2008/0222326 A1* | 9/2008 | Liu | G06F 3/023 |
| | | | 710/62 |
| 2011/0109552 A1 | 5/2011 | Yasutake | |
| 2014/0075062 A1* | 3/2014 | Yasuno | G06F 3/023 |
| | | | 710/62 |
| 2014/0319232 A1* | 10/2014 | Gourlay | G05D 23/1905 |
| | | | 236/51 |
| 2015/0077352 A1* | 3/2015 | Ma | G06F 3/03547 |
| | | | 345/173 |

OTHER PUBLICATIONS

Gaunting et al., "Method for Operating Simulation Touch Screen by Mouse", a machine English translation version of Chinese Patent Application CN 103472931A, published Dec. 25, 2013, pp. 1-24.
"Windows Touch Gestures Overview.pdf", extracted from website, https://web.archive.org/web/20151121192051/https://msdn.microsoft.com/en-us/library/windows/desktop/dd940543(v=vs.85).aspx, published Nov. 21, 2015, pp. 1-5.
"Making the Mouse Left-Handed in Windows 7.pdf", extracted from website, https://web.archive.org/web/20130304035512/http://www.bbc.co.uk/accessibility/guides/mouse_easier/left_handed/win/win7/index.shtml#extversion, published Mar. 4, 2013, pp. 1-3.

* cited by examiner

CONTROLLING A LOCAL APPLICATION RUNNING ON A USER DEVICE THAT DISPLAYS A TOUCHSCREEN IMAGE ON A TOUCHSCREEN VIA MOUSE INPUT FROM EXTERNAL ELECTRONIC EQUIPMENT

CROSS REFERENCE TO RELATED APPLICATIONS

This application is a continuation-in-part of earlier-filed U.S. application Ser. No. 15/160,047, filed on May 20, 2016, the contents and teachings of which are hereby incorporated by reference in their entirety.

BACKGROUND

A conventional electronic tablet enables its owner to access content via its touchscreen. In particular, the touchscreen simultaneously displays graphical content and receives touch input in the form of finger gestures (i.e., the tablet owner touches locations which are over the displayed graphical content). In response to this touch input, the electronic tablet performs particular operations.

Typically, the tablet owner holds the electronic tablet in one hand so that the touchscreen faces the owner, and enters the finger gestures on the touchscreen using the other hand. Examples of finger gestures include a single finger tap, a double finger tap, a single finger swipe, a two finger swipe, a pinch-in gesture (two fingers moving towards each other), and a pinch-out gesture (two fingers moving away from each other).

SUMMARY

Unfortunately, there are deficiencies to this above-described conventional approach to using a touchscreen of an electronic tablet. For example, suppose that the electronic tablet is being used in a desktop setting, i.e., the electronic tablet is supported upright on a stand and is connected to a hardware keyboard. In such a situation, it may be inconvenient and uncomfortable for the owner to lean forward and raise his/her arm from the hardware keyboard to provide finger gestures on the touchscreen. Moreover, for some tablet apps, there are small touch areas which are difficult to precisely select particularly if the owner has large fingers.

Additionally, suppose that the conventional electronic tablet runs a local application and is being used with an external display (e.g., a conventional desktop monitor). In such a situation, the owner of the electronic tablet is not able to directly interact with the external display (e.g., it is not possible for the owner to enter finger gestures on the external display to control the local application). Rather, the owner is still forced to look away from the external display and look at the touchscreen of the electronic tablet in order to find touchscreen locations and enter various types of user input (e.g., to click on a button on the touchscreen).

Furthermore, suppose that the owner wishes to play games on the electronic tablet. Unfortunately, touch interactions can be limiting in how well the owner can control some games compared to when the owner uses a game controller such as an electronic mouse on a personal computer.

In contrast to the above-described conventional approach to providing touchscreen gestures to a touchscreen of an electronic tablet, improved techniques are directed to using mouse input to operate a local application running on a user device that is equipped with a touchscreen. Such use of mouse input improves the user experience by enabling a user to provide fuller, faster, and more precise control over the local application. Moreover, such mouse input may be provided from external electronic equipment (e.g., a hardware mouse in direct communication with the user device, a nearby desktop computer equipped with hardware mouse, a remote desktop computer that communicates with the user device over a network, a remote server playing earlier-created automated scripts that provide mouse input, etc.). In such situations, there is robust and reliable control over the local application via mouse input.

One embodiment is directed to a method of controlling a local application running on a user device. The method includes receiving, by the user device, mouse input from external electronic equipment communicating with the user device. The user device has a touchscreen that displays a touchscreen image of the local application. The mouse input indicates user operation of a hardware mouse. The method further includes translating, by the user device, the mouse input into translated touchscreen input. The method further includes providing, by the user device, the translated touchscreen input to the local application running on the user device to operate the local application.

In some arrangements, the external electronic equipment includes a desktop computer apparatus. Here, the hardware mouse has a direct connection to the desktop computer apparatus and provides, through the direct connection, a mouse signal containing the mouse input to the desktop computer apparatus. Additionally, receiving the mouse input from the external electronic equipment includes acquiring a communications signal from the desktop computer apparatus. In these arrangements, the communications signal (i) is different from the mouse signal and (ii) contains the mouse input.

In some arrangements, the user device is a computerized appliance that runs the local application (e.g., a thermostat, an alarm system, a camera system, etc.). Here, providing the translated touchscreen input to the local application running on the user device includes inputting the translated touchscreen input to the local application to operate the computerized appliance.

In some arrangements, the user device is a mobile apparatus that runs the local application. In these arrangements, providing the translated touchscreen input to the local application running on the user device includes inputting the translated touchscreen input to the local application to control operation of the local application.

In some arrangements, the external electronic equipment further includes a set of intermediate devices which is interconnected between the user device and the desktop computer apparatus. In these arrangements, acquiring the communications signal from the desktop computer apparatus includes indirectly obtaining the communications signal from the desktop computer apparatus through the set of intermediate devices.

In some arrangements, the set of intermediate devices includes a relay server which is constructed and arranged to pair different user devices with different desktop computer equipment. In these arrangements, the method further includes, prior to obtaining the communications signal, exchanging communications between the user device and the relay server. The relay server creates a communications session that pairs the user device to the desktop computer apparatus in response to the exchanged communications.

In some arrangements, a first user residing at a first location possesses the user device. In these arrangements, a second user residing at a second location manually operates the hardware mouse having the direct connection to the desktop computer apparatus to provide the mouse signal containing the mouse input during the created communications session. The first location is remote from the second location (e.g., in a different room, in a different building, miles away, etc.).

In some arrangements, the method further includes providing a copy of the touchscreen image of the local application from the user device to the desktop computer apparatus while the second user manually operates the hardware mouse to provide the mouse signal containing the mouse input. Such operation enables the second user residing at the second location to view the copy of the touchscreen image.

In some arrangements, acquiring the communications signal from the desktop computer apparatus includes obtaining, by the user device, wireless communications containing the mouse input. Along these lines, the desktop computer apparatus may include a wireless transceiver, obtaining the wireless communications containing the mouse input includes receiving, by the user device, the wireless communications directly from the wireless transceiver of the desktop computer apparatus. Alternatively, a communications fabric, which is interconnected between the user device and the desktop computer apparatus, may include a wireless transceiver, and obtaining the wireless communications containing the mouse input includes receiving, by the user device, the wireless communications directly from the wireless transceiver of the communications fabric which is interconnected between the user device and the desktop computer apparatus.

In some arrangements, the external electronic equipment includes a server apparatus that stores an automated script containing the mouse input which indicates user operation of the hardware mouse. In these arrangements, receiving the mouse input from the external electronic equipment includes acquiring the mouse input from the server apparatus in response to the server apparatus playing the automated script containing the mouse input.

Another embodiment is directed to a computer program product having a non-transitory computer readable medium that stores a set of instructions to control a local application running on a user device. The set of instructions, when carried out by the user device, causes the user device to perform a method of:
(A) receiving mouse input from external electronic equipment communicating with the user device, the user device having a touchscreen that displays a touchscreen image of the local application, the mouse input indicating user operation of a hardware mouse;
(B) translating the mouse input into translated touchscreen input; and
(C) providing the translated touchscreen input to the local application running on the user device to operate the local application.

Yet another embodiment is directed to a user device which includes a communications interface, a touchscreen which (i) receives real touchscreen input in response to user touch input and (ii) displays user output, memory which stores a local application, and control circuitry coupled to the communications interface, the touchscreen, and the memory. The memory stores instructions that, when carried out by the control circuitry, cause the control circuitry to:
(A) receive mouse input from external electronic equipment communicating with the user device via the communications interface, the mouse input being received while the local application runs on the user device and while the touchscreen displays a touchscreen image of the local application, the mouse input indicating user operation of a hardware mouse,
(B) translate the mouse input into translated touchscreen input, and
(C) provide the translated touchscreen input to the local application running on the user device to operate the local application.

Examples of touchscreen input (or events) that is provided to the local application include finger tap gestures (single tap, double tap, triple tap, etc.), finger swipe gestures (one finger swipes, two finger swipes, etc.), and pinch gestures (pinch-in, pinch-out, etc.). Moreover, a user is able to continue to enter input into the actual touchscreen of the user device, and the local application is still able to process real touchscreen input.

It should be understood that, in the cloud context, some electronic circuitry such as the relay server may be formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved in using a hardware mouse to operate a local application running on a user device, which is equipped with a touchscreen, via mouse input.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to using mouse input to operate a local application running on a user device that is equipped with a touchscreen. Such use of mouse input improves the user experience by enabling a user to provide fuller, faster, and more precise control over the local application. Moreover, such mouse input may be provided from external electronic equipment (e.g., a hardware mouse in direct communication with the user device, a nearby desktop computer equipped with hardware mouse, a remote desktop computer that communicates with the user device over a network, a remote server playing earlier-created automated scripts that provide mouse input, etc.). In such situations, there is robust and reliable control over the local application via mouse input.

In accordance with some embodiments, a hardware mouse operates a local application running on a user device (e.g., a tablet device, a smart phone, a personal digital assistant, other types of mobile devices, a computerized appliance equipped with a touchscreen, etc.). Such use of the hardware mouse improves the user experience by enabling the user to provide fuller, faster, and more precise control over the local application. For example, suppose that the user device is a tablet with a touchscreen. In such a situation, the user may prop up the tablet so that the user is able to view content from the local application thus eliminating the need for an external display. Additionally, the user may connect the hardware mouse to the tablet (e.g., via a cable, via wireless communications, etc.) thus enabling the user to robustly and reliably control the local application via the hardware mouse (e.g., by moving the mouse over a flat surface, clicking on the right/left mouse buttons, scrolling the mouse wheel, etc.). Moreover, the user may further use a hardware keyboard thus enabling the user to operate the user device in a manner similar to that of controlling a conventional desktop computer.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
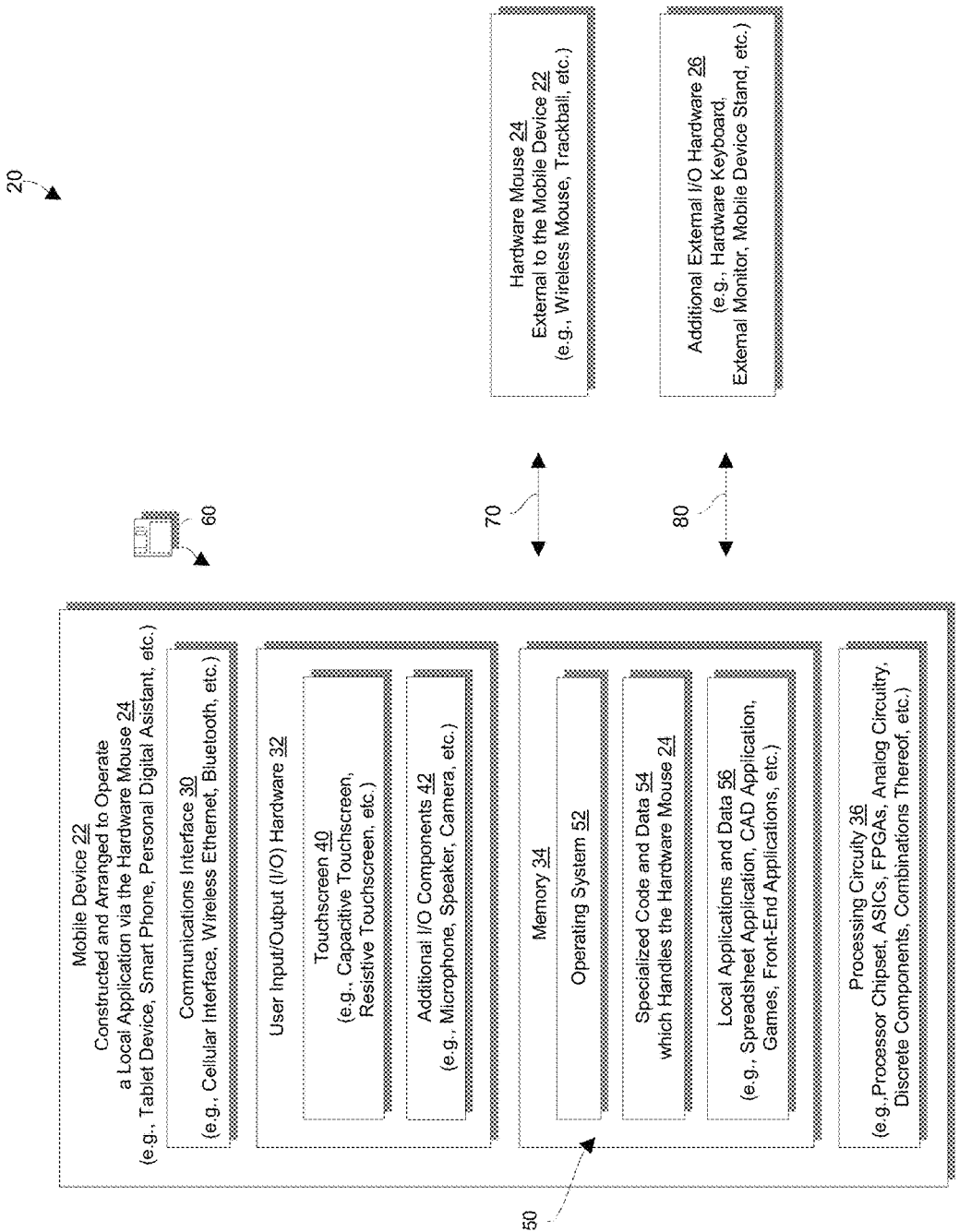
FIG. 1 is a block diagram of an electronic system that is provisioned with a hardware mouse to operate a local application.

FIG. 1 is a block diagram of an electronic system (or apparatus) 20 that is provisioned with a hardware mouse to operate a local application. The electronic system 20 includes a user device 22 (e.g., a tablet, a smart phone, a personal digital assistant, etc.), a hardware mouse 24, and perhaps additional external input/output hardware 26. The user device 22 includes a communications interface 30, user I/O hardware 32, memory 34, and processing circuitry 36.

The communications interface 30 is constructed and arranged to connect the user device 22 to various communications media such as a cellular network, a wireless router to a computer network, Bluetooth devices, and so on. Accordingly, the communications interface 30 enables communications with the other apparatus/devices. Such communications may be wireless or even line-based (e.g., radio frequency, fiber optic, infrared, via cables, combinations thereof, and so on).

The user I/O hardware 32 includes a touchscreen 40 and additional I/O components 42. In general, the touchscreen 40 (and perhaps the entire casing of the user device 22) has a relatively flat form factor and operates as both a visual display (i.e., outputs visual information to a user) and an input device (i.e., receives touch commands from the user). The additional I/O components 42 include I/O peripherals that are typical of a tablet or a smart phone such as a microphone, a speaker, a camera, one or more physical buttons, one or more light emitting diodes (LEDs), and so on.

The memory 34 is intended to represent both volatile storage and non-volatile storage (e.g., DRAM, SRAM, flash memory, EEPROM, etc.). The memory 34 stores a variety of software constructs 50 including an operating system 52, specialized code and data 54 which handles the hardware mouse 24, and local applications and data 56.

The processing circuitry 36 is constructed and arranged to operate in accordance with the various software constructs 50 stored in the memory 34. In particular, the processing circuitry 36, when executing the operating system 52, manages various resources of the user device 22 (e.g., memory allocation, processor cycles, hardware compatibility, etc.).

Additionally, the processing circuitry 36 operating in accordance with the specialized code and data 54 forms specialized control circuitry to process input from the hardware mouse 24. In particular, such specialized control circuitry conveys user input from the hardware mouse 24 to one or more local applications running on the user device 22. As will be described in further detail below, such operation may involve translating detected hardware mouse events into touchscreen input for use by one or more local applications running on the user device 22. Such operation may further involve conveying application-friendly processed mouse events to the local applications, relaying detected hardware mouse events to remote applications, and so on.

Furthermore, the processing circuitry 36 operating in accordance with the local applications and data 56 enables the user of the user device 22 to perform useful work. Examples of suitable local applications and data 56 include user-level applications such as a spreadsheet application, a CAD application, a file system navigation application, and so on. One should appreciate that there are many opportunities/use cases for a local application running on a user device 22 to receive high precise location input via a hardware mouse 24.

It should be understood that the above-mentioned processing circuitry 36 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 60 is capable of delivering all or portions of the software to the user device 22 (e.g., directly or perhaps through another device or peripheral component). The computer program product 60 has a non-transitory and non-volatile computer readable medium that stores a set of instructions to control one or more operations of the user device 22. Examples of suitable computer readable storage media include tangible articles of manufacture and apparatus that store instructions in a non-volatile manner such as flash memory, CD-ROM, disk memory, tape memory, and the like.

The hardware mouse 24 is external to the user device 22 and is constructed and arranged to exchange hardware mouse signals 70 with the user device 22. Such hardware mouse signals 70 may include mouse movement input, mouse button press input, mouse wheel scroll input, and so on. Such input is considered to be native mouse input since the source of the input is an actual mouse rather than a touchscreen. In some arrangements, the hardware mouse 24 is a three dimensional physical device which fits within the human hand to receive standard user input such as mouse clicks (e.g., button presses), scroll control (e.g., in response to operation of a mouse wheel), and directional control (e.g., in response to movement of the hardware mouse 24 over a surface).

The additional external I/O hardware 26 is also external to the user device 22 and exchanges additional electronic signals 80 to enhance the user's experience. The additional external I/O hardware 26 is optional. Examples include a hardware keyboard, an external monitor, a user device stand, external speakers, and so on.

It should be understood that the local applications and data 56 are configured to receive touchscreen input from both the real touchscreen 40, as well as a framework which processes input from the hardware mouse 24. As will be explained in further detail below, this framework is formed by the processing circuitry operating in accordance with the specialized code and data 54. Some of the local applications and data 56 may include native instructions (e.g., code written specifically for the applications) to receive the touchscreen input, and the specialized code and data 54 is later added via application wrapping. However, for other local applications and data 56, there is tighter integration with the specialized code and data 54 (e.g., via a software developer's kit or SDK). Example techniques for customizing applications are described in U.S. application Ser. No. 14/490,198, entitled "APPLICATION CUSTOMIZATION", the contents and teachings of which are hereby incorporated by reference in their entirety. Further details will now be provided with reference to FIG. 2.

Figure 2:
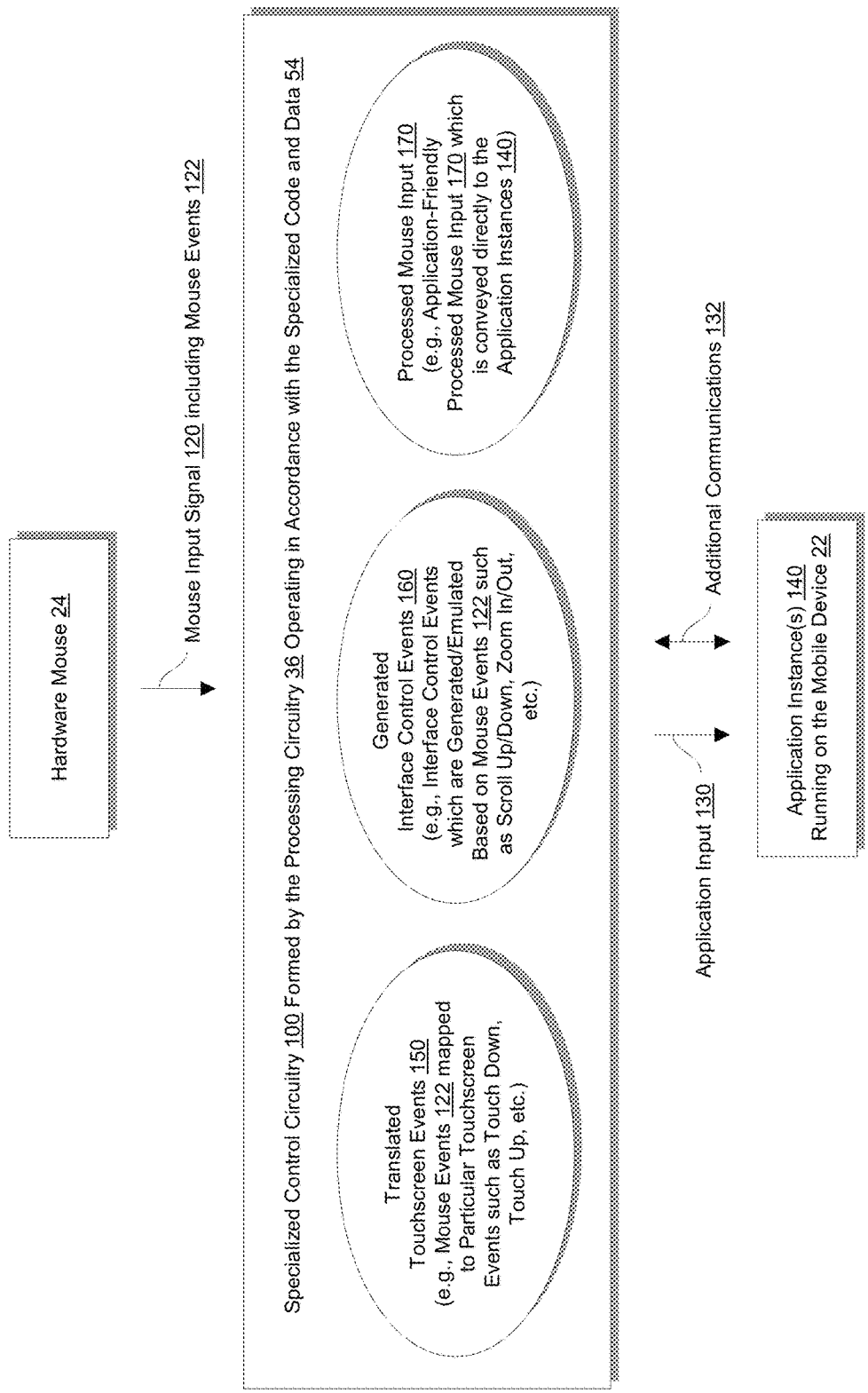
FIG. 2 is a block diagram illustrating various types of mouse input which is handled by specialized control circuitry of the electronic system of FIG. 1.

FIG. 2 is a block diagram illustrating various types of mouse input and how the user device 22, when operating in accordance with the specialized code and data 54, processes that mouse input based on a variety of criteria. As shown, the processing circuitry 36, when operating in accordance with the specialized code and data 54, forms specialized control circuitry 100 (also see FIG. 1).

The specialized control circuitry 100 receives a mouse input signal 120 from the hardware mouse 24. The mouse input signal 120 includes mouse events 122 such as mouse coordinates or directional displacement data, button input (e.g., button press, button release, etc.), wheel input, and so on.

Additionally, the specialized control circuitry 100 provides application input 130 to one or more application instances 140 running locally on the user device 24 (also see the local applications and data 56 in FIG. 1). As mentioned earlier, such local application instances (or simply applications) 140 may be highly graphical such as a spreadsheet, a CAD tool, etc. requiring high precision input which may be difficult or even impractical for a touchscreen.

During such operation, it should be understood that additional communications 132 may take place between the specialized control circuitry 100 and the locally running application 140 enabling the specialized control circuitry 100 to determine how to process native mouse input. In particular, the mouse events 122 include mouse coordinate information (e.g., X-Y locations) and, via the communications 132 with the application 140, the specialized control circuitry 100 is able to determine whether the mouse pointer is currently over a simple object (e.g., a button), scrollable content, zoomable content, and so on.

In some situations, the specialized control circuitry 100 translates (or maps) certain detected mouse events 122 into translated touchscreen events 150 and then provides the translated touchscreen events 150 to the applications 140. Along these lines, for a particular application 140, the specialized control circuitry 100 may detect a mouse button press followed by a mouse button release (e.g., when the user clicks and releases a mouse button). In response, the specialized control circuitry 100 simply translates the mouse button press to a touchscreen touch down event, and the mouse button release to a touchscreen touch up event. As a result, the application 140 receives and processes the touchscreen events in the same manner as if the user entered real finger touch events via the real touchscreen 40 (FIG. 1).

In other situations, the specialized control circuitry 100 processes (or manages) certain detected mouse events 122 into generated interface control events 160 and then provides the generated interface control events 160 to the applications 140. Along these lines, for a particular application 140, the specialized control circuitry 100 may process mouse wheel input (e.g., rotate forward or rotate reverse). In such a situation, the specialized control circuitry 100 then determines whether the pointer is currently over a window that contains scrollable content. If so, the specialized control circuitry 100 translates that set of mouse events into a series of interface control commands that effectuates scrolling of the content and provides the series of interface control commands to the application 140 for processing. Accordingly, the application 140 responds by scrolling the content (e.g., up or down depending on the direction of the mouse wheel input) in response to user operation of the hardware mouse 24. A similar operation may take place for a window containing zoomable content and in response to the user using the hardware mouse 24 to zoom in or zoom out.

In any of the above-described situations or in yet another situation, the specialized control circuitry 100 may pass certain detected mouse events 122 as application-friendly processed mouse input 170 to the applications 140. For example, for a particular application 140, the specialized control circuitry 100 may convey mouse movement input directly to a particular application 140 to reset an inactivity timer thus preventing the application 140 from entering a sleep mode, exiting the user, etc. As another example, the mouse pointer can be disabled and the mouse events 22 can be passed directly to a game application for further specialized processing of the application-friendly processed mouse input 170 in the context of the game application (e.g., aiming a weapon, etc.). Further details will now be provided with reference to FIG. 3.

Figure 3:
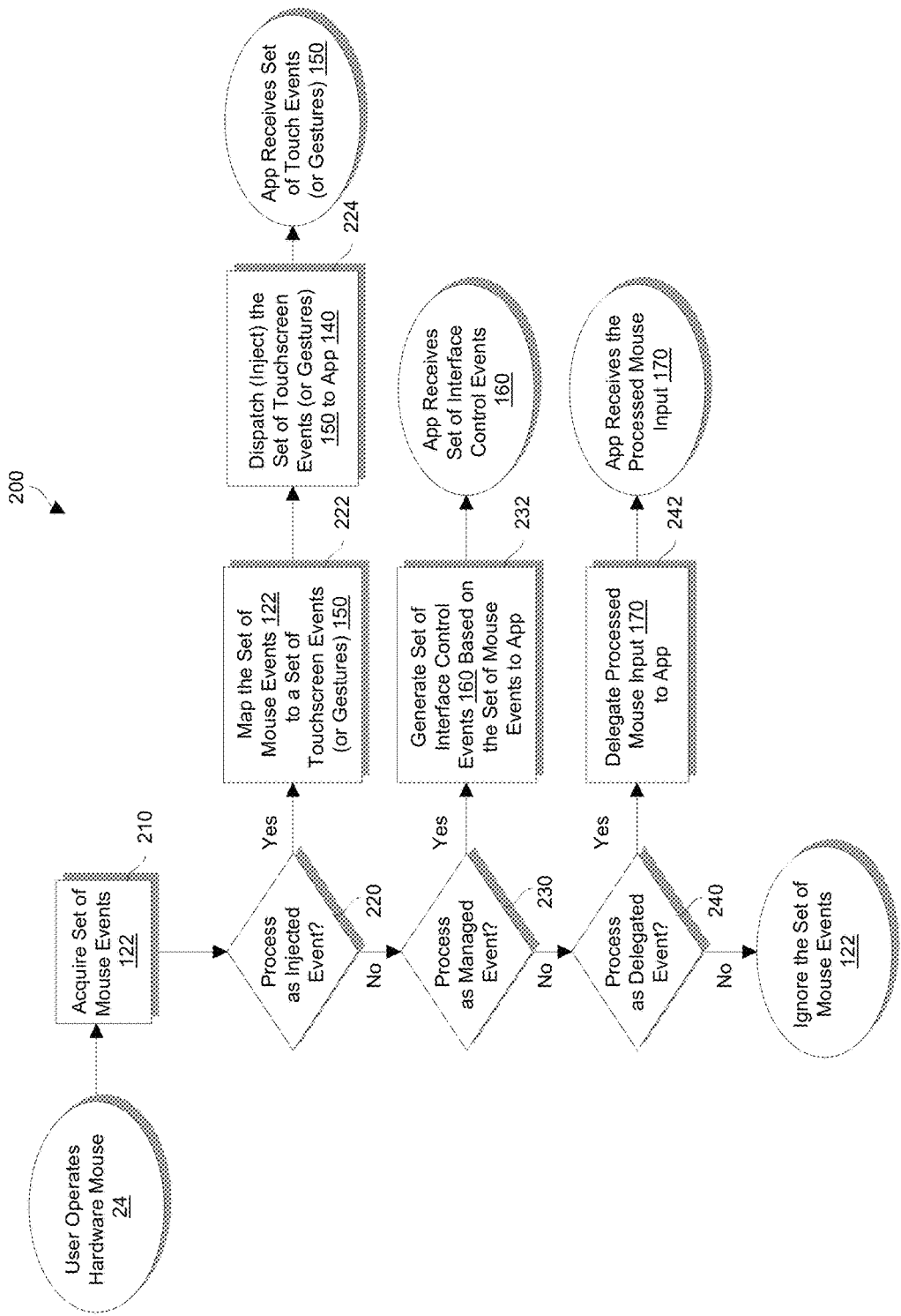
FIG. 3 is a block diagram showing particular operating details of the specialized control circuitry of the electronic system of FIG. 1.

FIG. 3 illustrates an example operational flow 200 of the specialized control circuitry 100 (also see FIG. 2). As shown, when a human user operates the hardware mouse 24, the specialized control circuitry 100 decides whether to (i) translate the mouse input into translated touchscreen events 150, (ii) generate interface control events 160 based on the mouse input, (iii) convey the mouse input directly to the application 140, or (iv) ignore the mouse input.

In particular, at 210, the specialized control circuitry 100 initially acquires a set of mouse events 122 in response to user operation of the hardware mouse 24. Next, at 220, the specialized control circuitry 100 decides whether to process the set of mouse events 122 as an injected event.

If the specialized control circuitry 100 decides to process the set of mouse events 122 as an injected event, the specialized control circuitry 100 maps the set of mouse events 122 to a set of touchscreen events (or gestures) 150, at 222. Then, at 224, the specialized control circuitry 100 dispatches the set of touchscreen events 150 to a locally running application 140. As a result, the application 140 receives the set of touchscreen events 150.

It should be understood that, at 220, the specialized control circuitry 100 may decide not to process the set of mouse events 122 as an injected event. In this situation, the specialized control circuitry 100 decides whether to process the set of mouse events 122 as a managed event at 230.

If the specialized control circuitry 100 decides to process the set of mouse events 122 as a managed event at 230, the specialized control circuitry 100 generates a set of interface control events 160 based on the set of mouse events 122, at 232. After the specialized control circuitry 100 has generated the set of interface control events 160 at 232, the application 140 receives the set of interface control events 160 for processing.

It should be understood that, at 230, the specialized control circuitry 100 may decide not to process the set of mouse events 122 as a managed (or processed) event. Here, the specialized control circuitry 100 decides whether to process the set of mouse events 122 as a delegated event at 240.

If the specialized control circuitry 100 decides to process the set of mouse events 122 as a delegated event 240, the specialized control circuitry 100 delegates application-friendly processed mouse input 170 to the application 140, at 242. After the specialized control circuitry 100 has delegated the application-friendly processed mouse input 170, the application 140 receives application-friendly processed mouse input 170 for further processing.

It should be understood that, at 240, the specialized control circuitry 100 may decide not to process the set of mouse events 122 as a delegated event. In this situation, the set of mouse events 122 are ignored.

It should be further understood that the operational flow 200 was provided for illustration purposes only and that other flows are suitable for use as well. For example, in a different use case such as the context of a game, the options of processing acquired mouse events 122 as injected events or managed events (220, 230) may be disabled all together thus allowing the game to process only application-friendly processed mouse input 170. In yet another user case, the application 140 simultaneously processes injected/managed events 150/160 along with application-friendly processed mouse input 170 so that an inactivity timer of the application 140 is reset in response to mouse activity while the user operates the application 140. Other configurations are suitable for use as well. Further details will now be provided with reference to FIG. 4.

Figure 4:
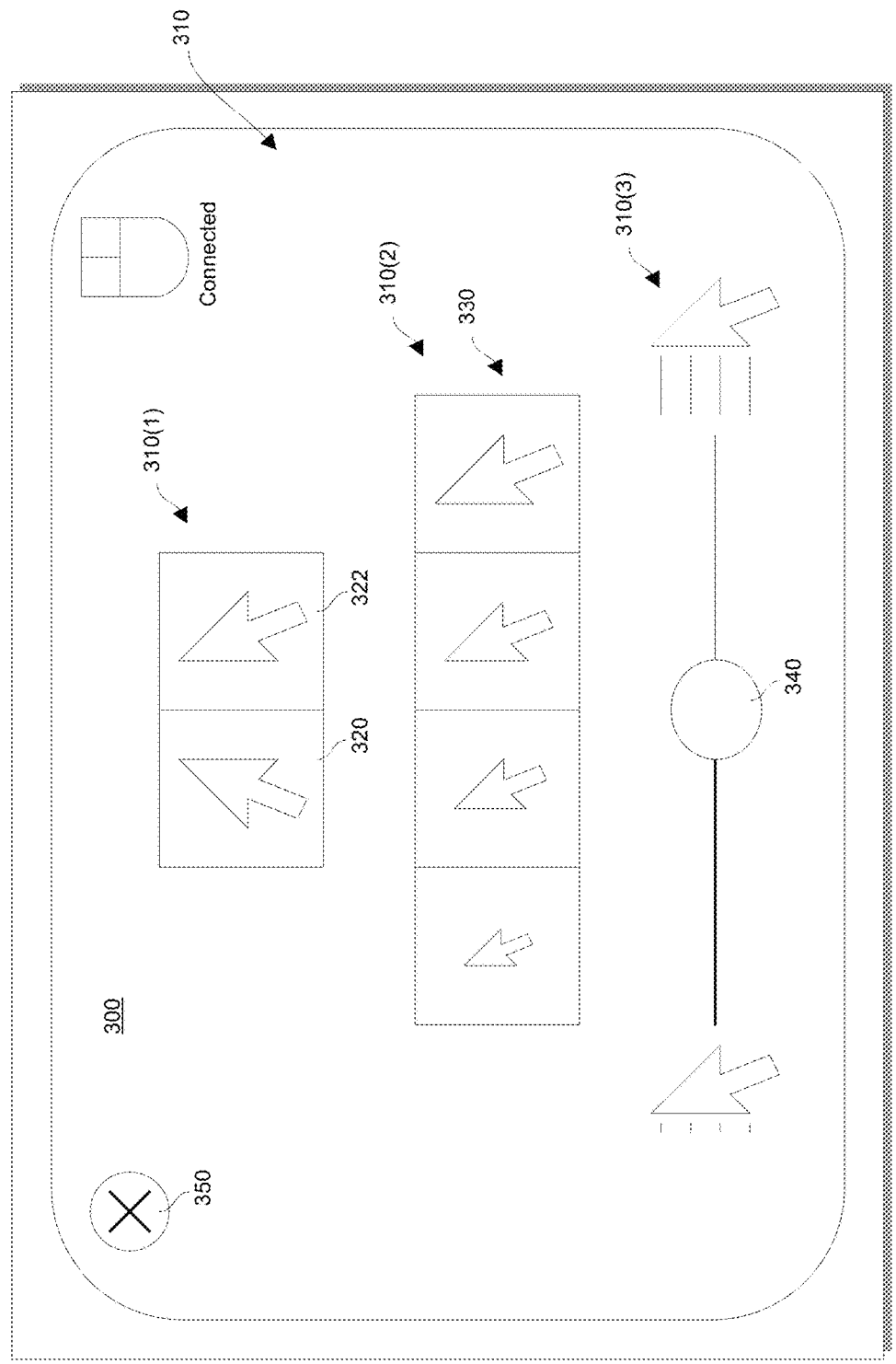
FIG. 4 is a block diagram of a graphical user interface of the electronic system that enables a user to customize operation of the hardware mouse.

FIG. 4 is a block diagram of an on-screen settings window of a graphical user interface (GUI) 300 of the electronic system 20 that enables a user to customize operation of the hardware mouse 24. The GUI 300 may be invoked/launched in a variety of different ways such as in response to detection of the hardware mouse 24 by the user device 22, by entering a special combination of mouse events 122, by activating a special icon or program on the user device 22, and so on.

As shown in FIG. 4, the window of the GUI 300 includes different sections 310(1), 310(2), and 310(3) for controlling different mouse aspects. The GUI 300 may include other control sections 310 as well (e.g., mouse connection status, controls to connect or disconnect the hardware mouse 24, etc.).

The section 310(1) of the GUI 300 allows the user to choose between a left-handed pointer or a right-handed pointer. In particular, if the user selects the button 320, the touchscreen 40 (and an external monitor if available, see additional external I/O hardware 26 in FIG. 1) displays a left-handed pointer. However, if the user selects the button 322, the touchscreen 40 (and the external monitor if available) displays a right-handed pointer.

The section 310(2) of the GUI 300 allows the user to control the size of the pointer. Although there are four different size selection buttons 330 offered by the GUI 300, a different number of size selection buttons 330 are suitable for use (e.g., two, three, five, and so on). Moreover, other styles of control are suitable for use as well such as a sliding horizontal scale, a sliding vertical scale, etc.

The section 310(3) of the GUI 300 allows the user to control the speed of the pointer. In particular, sliding the speed knob 340 to the left provides a slower moving pointer in response user movement of the hardware mouse 24. In contrast, sliding the speed knob 340 to the right provides a faster moving pointer in response user movement of the hardware mouse 24.

Other controls and statuses are suitable for including within the GUI 300 as well. For example, in some arrangements, the GUI 300 includes a section 310 that informs the user of the connection status of the hardware mouse 24. In some arrangements, the connection status is displayed in the same window as that shown in FIG. 4 (see upper right corner). In other arrangements, the connection status is displayed in a different window (e.g., in response to detected connection or disconnection of the hardware mouse 24).

Furthermore, if the user actuates the exit object 350, operation of the GUI 300 terminates. At that point, the GUI 300 disappears from the touchscreen 40 (and disappears on any external display) and the application 140 underneath is back in focus.

Additional Details

One should appreciate that the techniques disclosed herein enable a hardware mouse 24 to fully interface with and operate a user app on a user device 22 (e.g., a tablet, a smart phone, etc.). The techniques are further useful with tablets when used with a hardware keyboard in a desktop-like setting, or with productivity apps where the user interface includes many small touch areas, or any portable electronic device used with an external display where touch is not available, or with user games that can benefit from the use of a hardware mouse as a game controller providing the user with a fuller, faster and more precise control of the game.

Figure 5:
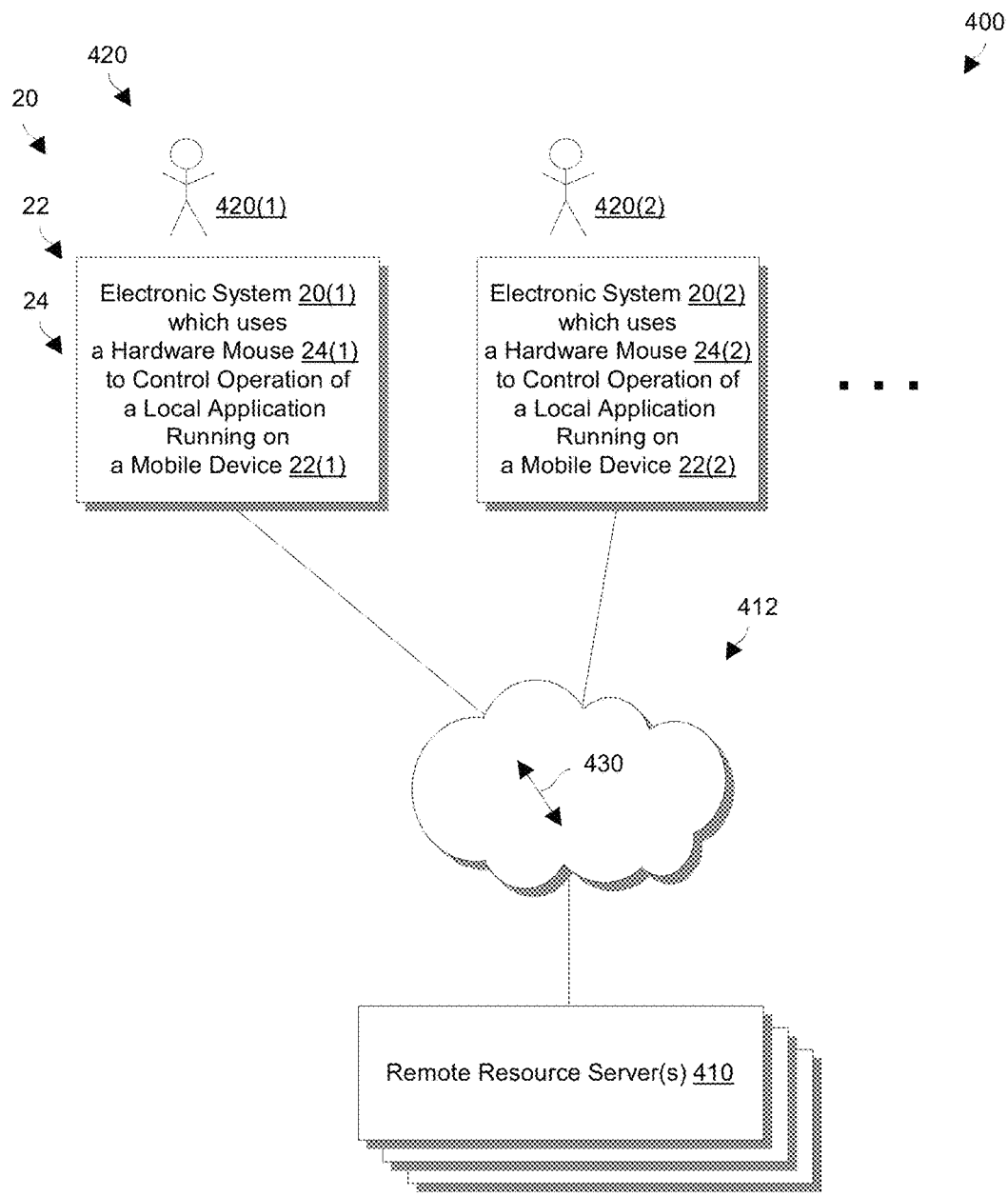
FIG. 5 is a block diagram of a computerized setting (or environment) that supports operation of the electronic apparatus of FIG. 1.

Additionally, the above-mentioned GUI 300 offers an on-screen settings window and connection status notifications that provide for a unique user experience (e.g., also see FIG. 5). The GUI 300 can uniquely overlay and blend with the application interface in a non-disruptive manner and without color or theme clashing. Furthermore, the GUI 300 the settings window can be invoked and controlled in a variety of ways including via use of the mouse buttons and wheel.

It should be understood that when conventional tablets are used in a desktop setting with a hardware keyboard attached or connected, it is not always easy or comfortable for the user to raise his/her arm to touch the touchscreen especially if a lot of touch input is required. Also, with some apps—especially productivity apps—using such apps with fingers while the conventional tablet is on a stand can be difficult or awkward, especially when are many small touch areas on the touchscreen or when user has large fingers. When the tablet's operating system does not provide native support for a mouse, it is difficult for a human to interact with some apps.

Additionally, when using a standard (non-touch) external display with a conventional tablet, it is not possible to interact with the app on the external display using touch events.

Furthermore, when playing certain games on a user device or tablet, touch interactions can be limiting in how well a human can control the game compared to when the human uses a game controller with console games or a mouse with games on a personal computer.

At least some of the improved techniques address these issues. Along these lines, a user is able to connect a hardware mouse 24 to a user device 22, e.g., using Bluetooth with a supported app on the user device 22. The user can position the hardware mouse 24 next to a hardware keyboard to interact with the app just like he/she would with a desktop computer. Additionally, the user can operate the hardware mouse 24 to interact with an app on an external display. Furthermore, the user can use the mouse to interact with a game like you would with a game on a personal computer.

As mentioned earlier, different detected mouse events 110 can be processed as different event groups.

1. Injected Events—These are events that map to specific touch and gesture events and are injected for the running application to receive.
   a. Mouse events 122 are acquired (e.g., captured) by the specialized control circuitry 100.
   b. Mouse events 122 are translated to touchscreen events and gestures 150 (see Event Translation below).
   c. Touchscreen events and gestures 150 are sent/injected to the locally running application 140.
   d. A supported app receives these touchscreen events and gestures 150 as if they were normal touch events or gestures entered by the user onto a real touchscreen 40 of the user device 22 (also see FIG. 1).
2. Managed Events—These are events that are not injected for the locally running application 140 to receive but are managed and processed by the specialized control circuitry 100 to emulate built-in system functionality or other functionality.
   a. Rotating the mouse wheel of the hardware mouse 24 while the mouse pointer is over scrollable content causes the scrollable content to scroll up or down.
   b. Rotating the mouse wheel of the hardware mouse 24 while mouse pointer is over a slider control causes the slider to move and adjust its value.
   c. Clicking and simultaneously rotating the mouse wheel of the hardware mouse 24 while the mouse pointer is over zoom-able content causes the zoom-able content to zoom in or out. This, in effect emulates the pinch-to-zoom functionality (e.g., pinch-in, pinch-out, etc.).
   d. Clicking with the primary mouse button of the hardware mouse 24 on the user device 22 status bar causes any scrollable content in horizontal range of the mouse pointer to scroll to the top in the case of the operating system emulating the system functionality of the same.
3. Delegated Events—These are events that are not injected nor processed by the specialized control circuitry 100 and may or may not be related to the application user interface, but can be delegated to the locally running application for it to process. The mouse events 122 available for delegation are:
   a. Mouse movement (absolute or relative)
   b. Primary button press/release
   c. Secondary button press/release
   d. Wheel press/release
   e. Wheel rotation Event delegation can be enabled throughout the locally running application 140 or for specific windows of the locally running application 140. Additionally, the locally running application 140 can choose to have some or all mouse events delegated. For example:
   a. Gaming API—a game can use delegated mouse events 170 to control the game (see Gaming API below) and disable all event injection and management.
   b. Application wrapper—specialized code added to an original application to utilize mouse input from a hardware mouse 24 may use some delegated mouse events 170 to renew an inactivity timer, while allowing all other events to be injected or managed.
   c. A remote desktop client may allow for event injection and management for the client user interface, but disable event injection and management for its remote session window. Here, the remote desktop client takes the delegated mouse events 170 for that window and forwards them to the server session. Such forwarded events can be translated if needed to the remote session's coordinate system. In this use case, there is a hybrid approach where the app is enlightened to the mouse events and can decide how the events are treated, based on context. This is made possible because of the event delegation process.

Event Translation—Tracking and Continuity

The event translation portion of this process enables full app interaction using the hardware mouse 14. In particular, the locally running application receives events in response to the user operating the hardware mouse 24 in the same way the locally running application receives touchscreen input. It requires tracking of mouse button events from the button press to the button release and all mouse moves in between the press and the release events. This creates the event continuity necessary to achieve full and proper event translation from mouse events to touch and gesture events. This in turn allows for full app interaction matching the corresponding touch events, like:
   a. One-finger taps or double taps (or triple taps etc.), long presses, swipes and all one-finger gestures. These are driven by the primary mouse button.
   b. 3D touch is driven by the secondary button and corresponds to what is known in the desktop world as "right-clicking" to bring up a context menu.
   c. Some two-finger touch events are supported by pressing both the primary and secondary mouse buttons and include two-finger taps (or double taps etc), two-finger long presses and two-finger swipes. Other two-finger gestures are made possible via touchscreen event generation, for example pinch to zoom (see Managed Events which are generated and sent to the application).
   d. Multiple mice can also be used, with events from each mouse corresponding to separate touch events. This can include one user with a mouse in each hand, or two or more users collaborating. This may result in multi-touch gestures, or it may result in independent multi-touch events depending on the view settings, since the view may or may not be set up for multi-touch support.

Event Synchronization

Synchronization/arbitration of injected events with native touch events is added to avoid race conditions and allow injected events to work in conjunction with native touch events.

Mouse Related User Experience

1. The framework provides a mouse pointer (e.g., an arrow) above all other content on the screen and moves the mouse pointer as the user moves the hardware mouse 24. Accordingly, the user can target where the user wants to click. The mouse pointer can be turned off when not needed, e.g., when in gaming mode.
2. User can simultaneously click Left+Right+Wheel on the mouse to instruct the framework to display an on-screen settings window (also see FIG. 4) that overlays all other content, so the user can change mouse settings. The settings window can be disabled when not needed, e.g., when an application provides its own mouse settings interface. By way of example, settings/elements may include:
   a. Left-handed/Right-handed option
   b. Pointer Size option
   c. Pointer Tracking/Speed option
   d. Connection Status indicator
   e. Close button
   f. Other options, e.g., different pointer colors, different pointer shapes, etc.
3. The framework provides an on-screen connection status window that overlays all other content when it detects the mouse is connected or disconnected. Accordingly, the user is aware of the mouse connectivity status. The connection status windows can be disabled when not needed, e.g., when an application provides its own mouse connection status interface.

Delivery Methods

1. Application wrapping—Code for the framework is added to an original application that is initially not equipped to receive input from a hardware mouse 24 via an application wrapping process. The application wrapping process is controlled at the source (e.g., an online application store, an application server, etc.) by controlling the loading and unloading of the framework code based on policy.
2. Dynamic containerization—The framework code is added to the application as part of a containerization process. Here, the source controls the loading of the framework code. Alternatively, the framework can load itself via code injection.
3. Software developer's kit (SDK) mode—The framework code is compiled into a separate app which in turn initializes and loads the framework code via its published application programming interface (API). The framework code then handles the rest. In SDK mode, an app can choose to disable touch injection and/or event management for some or all of its windows and instead choose to have some or all mouse events delegated for it to process.

Gaming API

It should be understood that games can use the framework in SDK mode and choose to have some or all mouse events delegated to them and enable a Relative Mouse Movement mode. When in this mode, the mouse pointer is not shown. Rather, the games can use the mouse movement events to do things like rotate the camera angle or turn the steering wheel on a car and use button press events for accelerating, breaking or in the case of a shooter game firing or throwing grenades, and so on.

For example, in a shooter game, the game can use relative mouse movements to turn the camera left/right and up/down, right button events to fire and repeat fire (when button is held down), left mouse button events to walk forward and mouse wheel click events to walk backward, etc. As another example, the shooter game can use input from the mouse wheel for scrolling to select from a list of available weapons. Other scenarios exist which enable use of the hardware mouse 24 to play the game in order to give the user more control of the game.

Local Injection of Server Mouse Events

Another use-case involves using the user device 22 in a desktop context. In this situation, external electronic equipment which includes a hardware keyboard and a hardware mouse are bound directly or indirectly to the user device 22 (e.g., via Bluetooth, through one or more intermediate devices, over a computerized network, etc.). Accordingly, the hardware mouse sends mouse events to the user device 22 in response to user operation. The user device 22 then processes the mouse events via the framework as described above.

In some arrangements, a desktop-connected mouse generates events, which are then relayed to a user device 22 and injected into the application using the mouse framework disclosed herein. Yet another use-case is where the user device 22 is bound to a mouse-equipped desktop computer indirectly, via a server or service acting as a relay. In such case, both the user device 22 and the desktop computer communicate with the relay server or service, which relays the desktop generated mouse events to the user device 22.

Further Details

FIG. 5 is a block diagram of a computerized setting (or environment) 400 that supports operation of one or more electronic systems 20. The computerized setting 400 includes electronic systems 20(1), 20(2), . . . , one or more remote resource servers 410, and a communications medium 412.

As mentioned earlier, each electronic system 20 includes a user device 22 and a hardware mouse 24, and operates in response input from a user 420. That is, the electronic system 20(1) includes a user device 22(1) and a hardware mouse 24(1), and operates in response to input from a user 420(1). Likewise, the electronic system 20(2) includes a user device 22(2) and a hardware mouse 24(2), and operates in response to input from a user 420(2), and so on.

The remote resource servers 410 are constructed and arranged to provide the users 420 with access to remote resources. Examples of suitable remote resources include remote desktops, remote applications, remote virtual machines and virtualization platforms, and so on. In some arrangements, the users 420 are able to control remote resources (e.g., remote desktops, remote applications, etc.) in a manner similar to that of controlling local applications 140 as described above.

The communications medium 412 is constructed and arranged to connect the various components of the computerized setting 20 together to enable these components to exchange electronic signals 430 (e.g., see the double arrow 430). At least a portion of the communications medium 412 is illustrated as a cloud to indicate that the communications medium 412 is capable of having a variety of different topologies including backbone, hub-and-spoke, loop, irregular, combinations thereof, and so on. Along these lines, the communications medium 412 may include copper-based data communications devices and cabling, fiber optic devices and cabling, wireless devices, combinations thereof, etc. Furthermore, the communications medium 412 is capable of supporting LAN-based communications, cellular communications, plain old telephone service (POTS) communications, combinations thereof, and so on.

It should be understood that the computerized setting 20 may include other devices as well such as standard desktop computers, standard tablets, standard smart phones, and so on. Advantageously, the electronic systems 20 allow the users 420 to control more complex application such as local spreadsheet programs, local CAD tools, etc. which require fine user control and which are not practical for standard touchscreens. Further details will now be provided with reference to FIG. 6.

Figure 6:
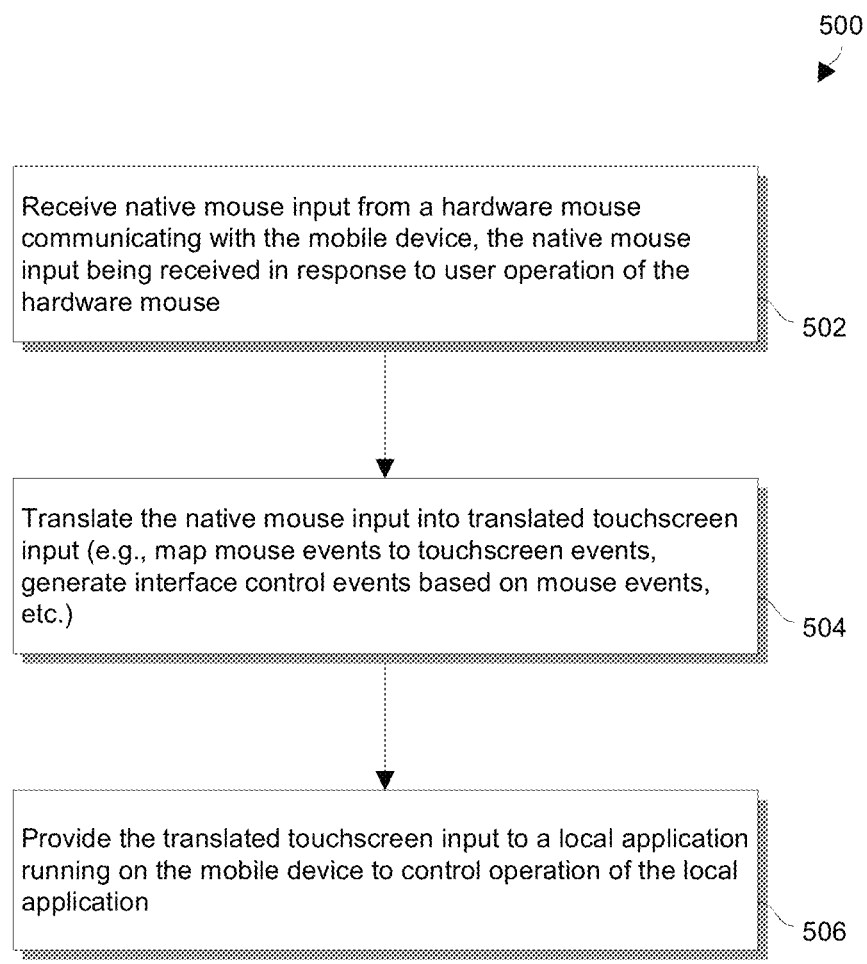
FIG. 6 is a flowchart of a procedure that is performed by the electronic system of FIG. 1.

FIG. 6 is a flowchart of a procedure 500 that is performed by an electronic system 20. In particular, the procedure 50 operates a local application 140 running on a user device 22.

At 502, processing circuit of the user device 22 receives native mouse input from a hardware mouse communicating with the user device. The native mouse input is received in response to user operation of the hardware mouse.

At 504, the processing circuitry translates the native mouse input into translated touchscreen input. For example, based on factors such as the particular application and the particular mouse events, the processing circuitry may translate (or map) mouse events to touchscreen events or gestures. As another example, based on the factors, the processing circuitry may generate interface control events based on the mouse events.

At 506, the processing circuitry provides the translated touchscreen input to the local application running on the user device to control operation of the local application. In response, the local application may perform a variety of operations such as selecting an object or text, drawing a line or connecting multiple points, scrolling up or down, zooming in or out, etc. In some situations, the fact that the input was entered via a hardware mouse is transparent to the local application. That is, the local application simply receives and processes touchscreen input regardless of whether the touchscreen input came from a real touchscreen or the hardware mouse.

It should be understood that certain application-friendly processed mouse input can be conveyed concurrently to the local application as well. For example, the local application may receive application-friendly processed mouse input and, in response, reset an inactivity timer to prevent the local application from going to sleep, exiting, etc.

As described above, improved techniques are directed to using a hardware mouse 24 to operate a local application 140 running on a user device 22. Such use of the hardware mouse 24 improves the user experience by enabling the user 420 to provide fuller, faster, and more precise control over the local application 140. For example, suppose that the user device 24 is a tablet with a touchscreen. In such a situation, the user 420 may prop up the tablet (e.g., on a stand) so that the user is able to view content from the local application 140 thus eliminating the need for an external display. Additionally, the user 420 may connect the hardware mouse 24 to the tablet (e.g., via a cable, via wireless communications, etc.) thus enabling the user 420 to robustly and reliably control the local application 140 via the hardware mouse 24 (e.g., by moving the mouse 24 over a flat surface, clicking on the right/left mouse buttons, scrolling the mouse wheel, etc.). Furthermore, the user 420 may further use a hardware keyboard thus enabling the user to operate the user device 22 in a manner similar to that of controlling a conventional desktop computer. Moreover, if the user 420 chooses to use an external monitor, the user does not need to look away from the external monitor to the user device, but instead may view a pointer on the external monitor while manually operating the hardware mouse 24.

Additionally, one should appreciate that the above-described techniques amount to more than simply operating an application using a mouse. Rather, the techniques involve evaluating mouse events to decide whether to map the mouse events to touchscreen events, whether to generate interface control events based on the mouse events, and/or whether to provide application-friendly processed mouse input to the application. Such operation provides an improvement to the technology of standard touchscreen control of user device applications.

Example Configurations

Figure 7:
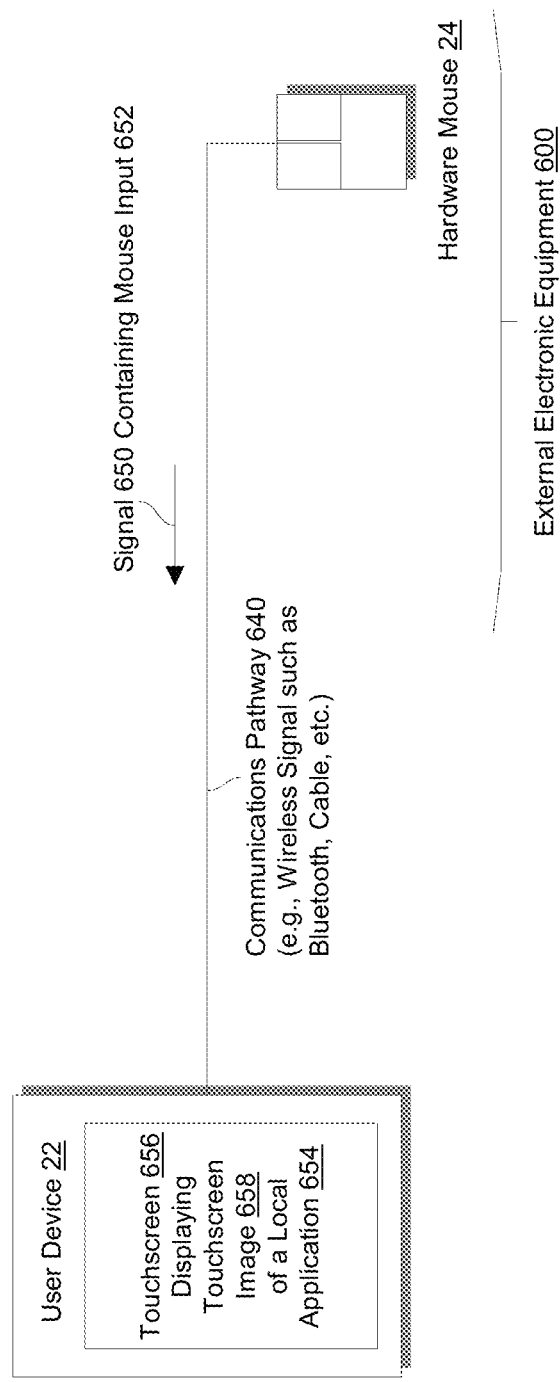
FIG. 7 is a block diagram of a first example configuration for controlling a local application running on a user device having a touchscreen via mouse input.
Figure 8:
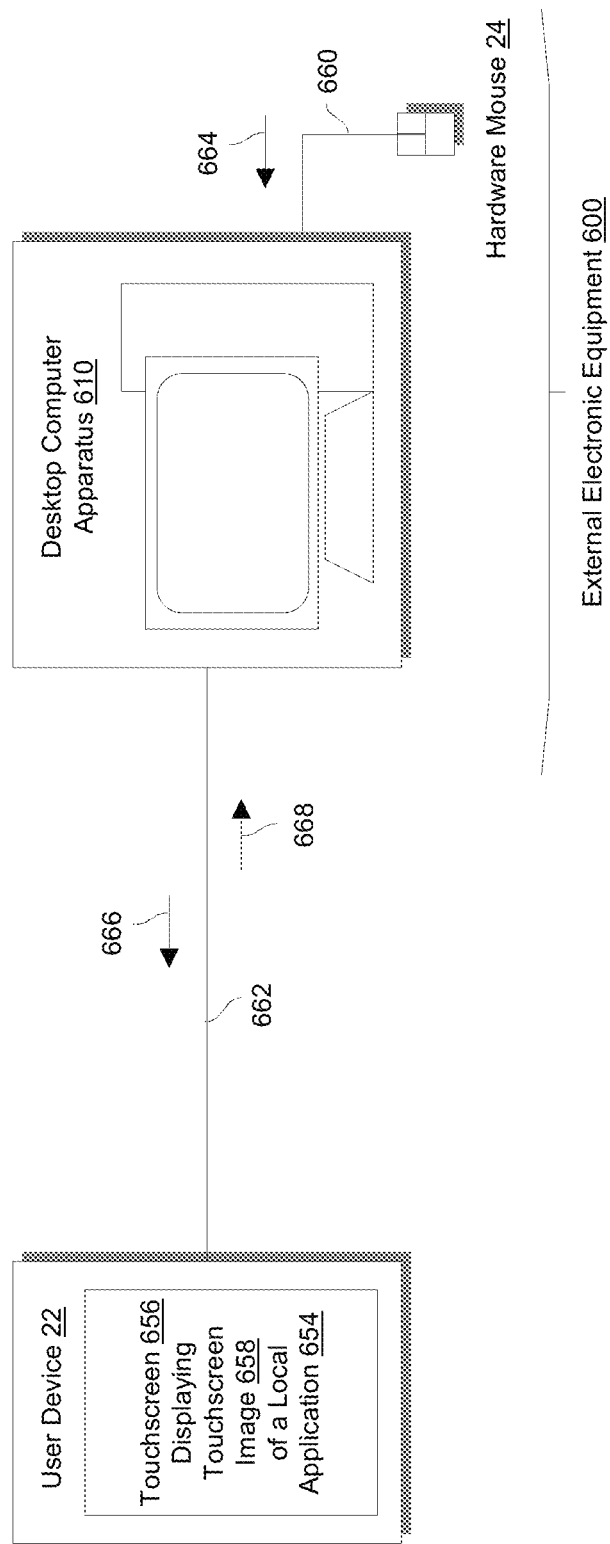
FIG. 8 is a block diagram of a second example configuration for controlling a local application running on a user device having a touchscreen via mouse input.
Figure 9:
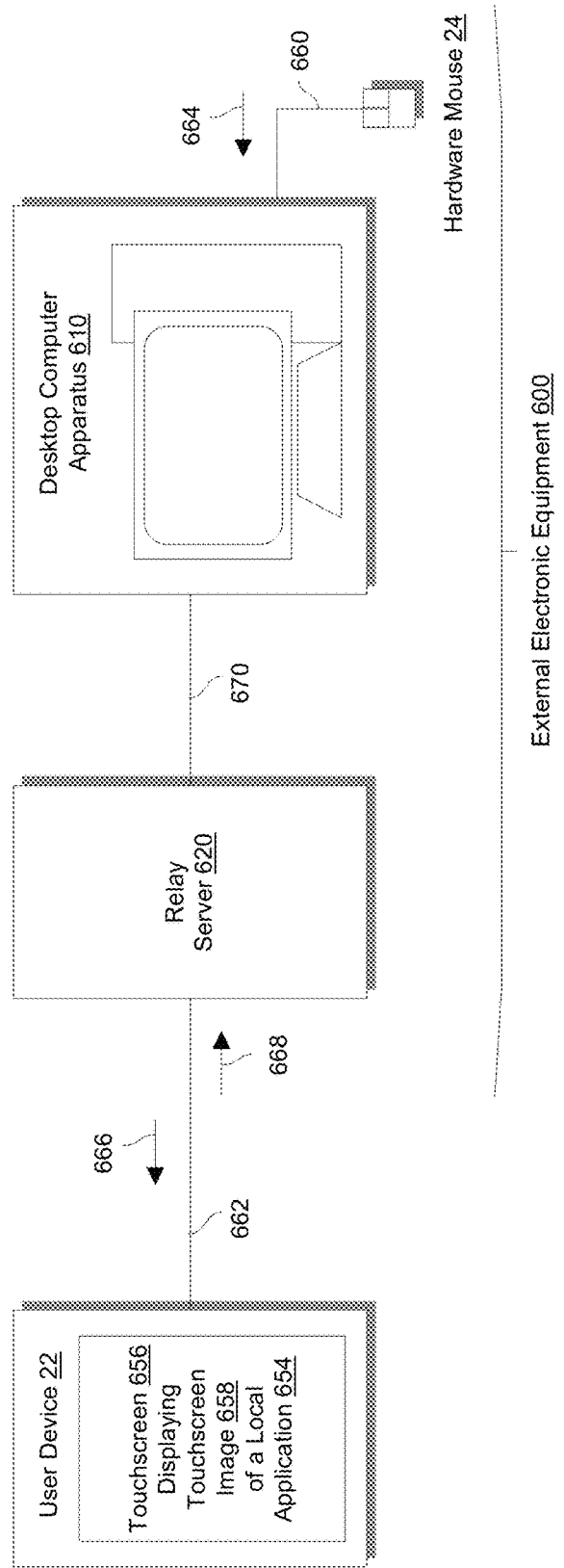
FIG. 9 is a block diagram of a third example configuration for controlling a local application running on a user device having a touchscreen via mouse input.
Figure 10:
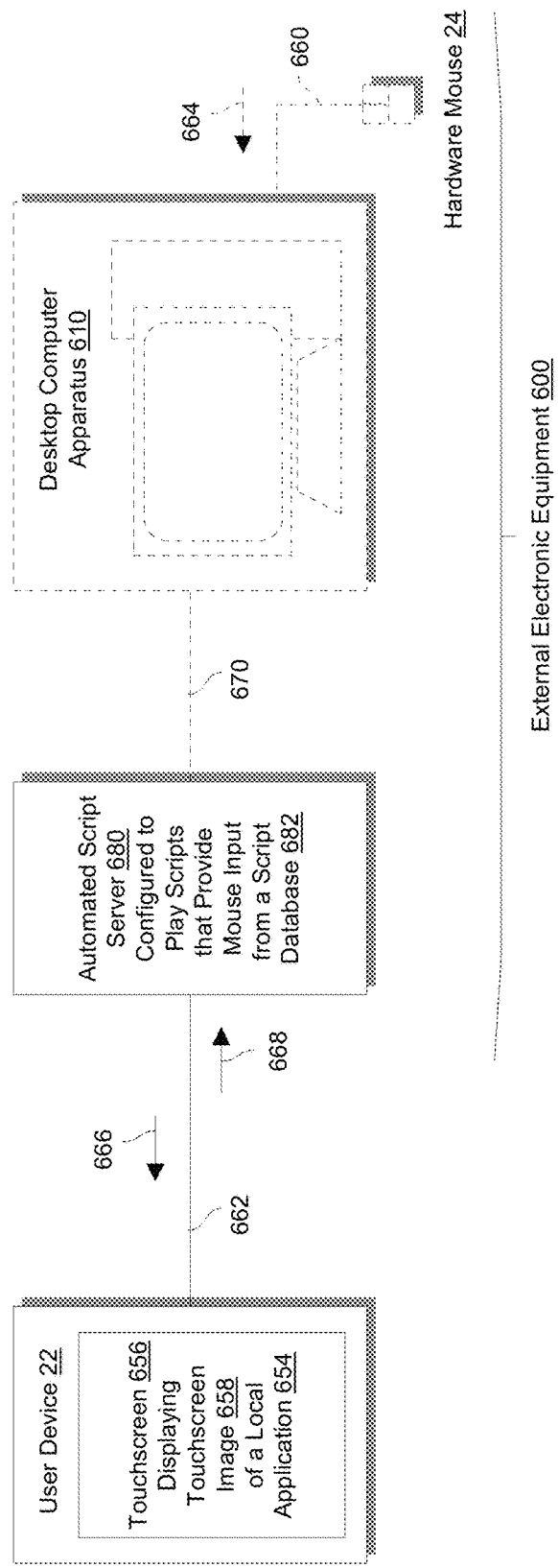
FIG. 10 is a block diagram of a fourth example configuration for controlling a local application running on a user device having a touchscreen via mouse input.

FIGS. 7 through 10 show certain details of different example configurations for controlling a local application running on a touchscreen-equipped user device 22 via external electronic equipment 600 that includes a hardware mouse 24. FIG. 7 shows a first example configuration in which a user device 22 communicates directly with a hardware mouse 24. FIG. 8 shows a second example configuration in which a user device 22 receives mouse input from external electronic equipment 600 such as a desktop computer apparatus (or user workstation) 610 which is equipped with a hardware mouse 24. FIG. 9 shows a third example configuration in which a user device 22 receives mouse input from external electronic equipment 600 such as a desktop computer 610 which is equipped with a hardware mouse 24 in combination with a relay server 620. FIG. 10 shows a fourth example configuration in which a user device 22 receives mouse input from external electronic equipment 600 such as an automated script server 630 which is configured to play scripts that provide mouse input indicating operation of a hardware mouse 24.

In connection with the first example configuration and with reference to FIG. 7, the user device 22 may communicate directly with the hardware mouse 24 over a communications pathway 640 that connects the user device 22 to the hardware mouse 24. Here, the hardware mouse 24 may connect wirelessly such as via a wireless protocol such as Bluetooth, Infrared Wireless, etc. Alternatively, the hardware mouse 24 may connect via a cable and thus provide an electrical (or optical) mouse signal to the user device 22.

Here, the electronic equipment 600 which is external to the user device 22 is simply the hardware mouse 24 (and perhaps a cable). Accordingly, the user device 22 directly receives and processes the signal 650 containing the mouse input 652 which is output by the hardware mouse 24. As a result, the mouse input 652 controls operation of a local application 654 while the touchscreen 656 of the user device 22 displays a touchscreen image 658 of the local application 654.

In connection with the second example configuration and with reference to FIG. 8, the user device 22 may communicate directly with a desktop computer apparatus 610 which is equipped with a hardware mouse 24. Here, a first communications pathway 660 exists between the hardware mouse 24 and the desktop computer apparatus 610 (e.g., a chassis having a processor, a network interface, etc. along with a display and keyboard). Additionally, a second communications pathway 662 exists between the desktop computer apparatus 610 and the user device 22. Accordingly, the hardware mouse 24 is bound to the desktop computer apparatus 610, and the desktop computer apparatus 610 is similarly bound to the user device 22.

Each communications pathway 660, 662 may be wireless, cable-based, or a combination of wireless and cable. For wireless communications (e.g., Bluetooth, WiFi, Infrared Wireless, etc.), the desktop computer apparatus 610 may include a set of wireless interfaces (i.e., one or more wireless transceivers).

During operation, the first communications pathway 660 carries a mouse signal 664 containing the mouse input from the hardware mouse 24 to the desktop computer apparatus 610. Additionally, the second communications pathway 662 carries a communications signal 666 containing the mouse input from the external electronic equipment 600 to the user device 22. Accordingly, the mouse input 652 controls operation of a local application 654 while the touchscreen 656 of the user device 22 displays a touchscreen image 658 of the local application 654.

In some arrangements, the user device 22 provides a signal 668 containing a copy of the touchscreen image 658 to the desktop computer apparatus 610 to enable the desktop computer apparatus 610 to display the touchscreen image 658 on a desktop display. As a result, a user operating the hardware mouse 24 may simply view the display of the desktop computer apparatus 610 without directly viewing the touchscreen 656 of the user device 22.

At this point, one should appreciate that the first and second example configurations are well-suited for situations in which a user prefers to operate the local application running on the user device 22 (or at least enter certain user input) via the hardware mouse 24. As mentioned earlier, the user device 22 translates the mouse input from the hardware mouse 24 into translated touchscreen input, and provides the translated touchscreen input to the local application 654 for processing.

In connection with the third example configuration and with reference to FIG. 9, the user device 22 communicates indirectly with the desktop computer apparatus 610 through a set of intermediate devices including a relay server 620. The relay server 620 is configured to pair different user devices 22 (also see FIG. 5) with different desktop computer apparatus 610 to create communications sessions.

For example, a particular user device 22 may bind to the relay server 620 (e.g., via Wi-Fi, Ethernet, a cellular connection, combinations there, etc.). Additionally, the hardware mouse 24 binds to a particular desktop computer apparatus 610. Furthermore, with the particular desktop computer apparatus 610 in communication with the relay server 620 via a network connection 670 (e.g., Wi-Fi, Ethernet, etc.), the relay server 620 provides a relay service that binds the particular user device 22 to the particular desktop computer apparatus 610.

In a particular situation, the relay server 620 identifies user devices 22 which are available for mouse control. The relay server 620 then creates a communications session by matching a particular user device 22 to a particular desktop computer apparatus 610. Once a particular user device 22 is paired to a particular desktop computer apparatus 610 by the relay server 620, the particular user device 22 receives and processes mouse input from the particular desktop computer apparatus 610.

One should appreciate that the third example configuration is well-suited for multi-user situations in which a first user that owns or controls a user device 22 may desire a second user that owns or controls a desktop computer apparatus 610 to temporarily provide mouse input from the desktop computer apparatus 610 to the user device 22. A particular example is when the first user is in need of technical support for the user device 22. Here, the human operator of the particular desktop computer apparatus 610 is able to operate the particular user device 22 following pairing performed by the relay server 620. Along these lines, the human operator of the particular desktop computer apparatus 610 is further able to receive a user device signal 668 to view the image 658 of the touchscreen 656 from a display of the desktop computer apparatus 610 and thus operate the local application 654 on the user device 22 remotely, i.e., from a different location than that of the human that currently possesses the user device 22. The users may be in different rooms, buildings, campuses, cities, states, coasts, etc.

In connection with the fourth example configuration and with reference to FIG. 10, the user device 22 communicates with an automated script server 680 having an automated script database 682. The automated script server 680 is configured to play automated scripts from the database 682 to perform various procedures on user devices 22. Each script includes mouse input that indicates movement of a hardware mouse 24.

During operation, the automated script server 680 receives commands to play automated scripts from the database 682. Such commands may originate from a user device 22 or from a desktop computer apparatus 610. In some arrangements, the automated scripts are recordings of actual user sessions and include mouse input, keyboard input, or both. Such scripts may have previously acquired mouse input from a user operating a desktop computer apparatus 610 via a hardware mouse 24 (shown in phantom in FIG. 10).

One should appreciate that the fourth example configuration is well-suited for situations in which one or more standard procedures are to be performed on a user device 22. In particular, rather than require a real human operator to perform a procedure on the user device 22, the automated script server 680 plays an appropriate automated script from the database 682 to effectuate the procedure on the user device 22. In some arrangements, the automated script server 680 monitors response activity from the user device 22 (e.g., evaluates the signal 668 from the user device 22) to confirm proper response behavior by the user device 22 while the script plays. Such operation is less burdensome, more consistent, and less prone to human error.

Figure 11:
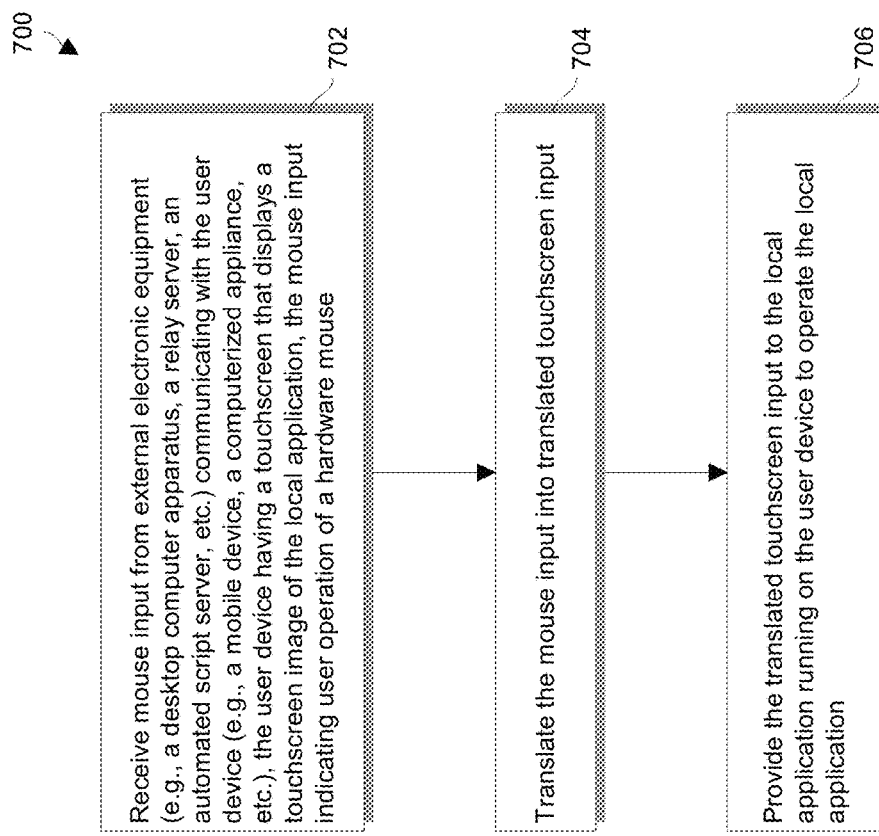
FIG. 11 is a flowchart of a procedure that is performed by various example configurations including those of FIGS. 7 through 10.

FIG. 11 is a flowchart of a procedure 700 that is performed by various circuitry disclosed herein such as the example configurations of FIGS. 7 through 10 to control a local application running on a user device 22. As mentioned earlier, example user devices 22 include mobile devices, computerized appliances (e.g., thermostats, alarm systems, door locks, etc.), and the like.

At 702, the user device 22 receives mouse input from external electronic equipment communicating with the user device. The user device has a touchscreen that displays a touchscreen image of the local application. The mouse input indicates user operation of a hardware mouse. As mentioned earlier, the hardware mouse may directly connect to the user device (FIG. 7). Alternatively, the external electronic equipment may include a desktop computer apparatus (FIG. 8), a relay server (FIG. 9), an automated script server (FIG. 10), combinations thereof, and so on.

At 704, the user device 22 translates the mouse input into translated touchscreen input. A variety of translation techniques are disclosed herein (e.g., also see FIGS. 2 and 3).

At 706, the user device 22 provides the translated touchscreen input to the local application running on the user device to operate the local application. Accordingly, the local application may be controlled via mouse input, touchscreen input, or both.

As mentioned above, improved techniques are directed to using mouse input to operate a local application running on a user device 22 that is equipped with a touchscreen. Such use of mouse input improves the user experience by enabling a user to provide fuller, faster, and more precise control over the local application. Moreover, such mouse input may be provided from external electronic equipment 600 (e.g., a hardware mouse in direct communication with the user device 22, a nearby desktop computer equipped with hardware mouse, a remote desktop computer that communicates with the user device over a network, a remote server playing earlier-created automated scripts that provide mouse input, etc.). In such situations, there is robust and reliable control over the local application via mouse input.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the computerized setting 20 (FIG. 5) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

Additionally, it should be understood that the pointing device utilized by the user devices 22 was described above as a hardware mouse 24. The term hardware mouse 24 may refer to any standard type of pointing device such as a cabled or wireless mouse. The term hardware mouse 24 may also refer to other types of pointing devices such as trackballs, pointer buttons, joysticks, and so on.

Moreover, one should appreciate that the specialized code and data 54 may be tightly integrated with a local application 56 to the point that they form a single app running on the user device. In other arrangements, the specialized code and data 54 forms a specialized "front-end" to one or more applications receiving native mouse input on the "back-end". Such modifications and enhancements are intended to belong to various embodiments of the disclosure.

What is claimed is:

1. A method of controlling a local application running on a user device, the method comprising:
   receiving, by the user device, mouse input from external electronic equipment communicating with the user device, the user device having a touchscreen that displays a touchscreen image of the local application, the mouse input indicating user operation of a hardware mouse;
   translating, by the user device, the mouse input into translated touchscreen input; and
   providing, by the user device, the translated touchscreen input to the local application running on the user device to operate the local application;
   wherein the external electronic equipment includes a desktop computer apparatus;
   wherein the hardware mouse has a direct connection to the desktop computer apparatus and provides, through the direct connection, a mouse signal containing the mouse input to the desktop computer apparatus;
   wherein receiving the mouse input from the external electronic equipment includes acquiring a communications signal from the desktop computer apparatus, the communications signal (i) being different from the mouse signal and (ii) containing the mouse input;
   wherein the external electronic equipment further includes a set of intermediate devices which is interconnected between the user device and the desktop computer apparatus; and
   wherein acquiring the communications signal from the desktop computer apparatus includes indirectly obtaining the communications signal from the desktop computer apparatus through the set of intermediate devices.

2. A method as in claim 1 wherein the user device is a computerized appliance that runs the local application; and
   wherein providing the translated touchscreen input to the local application running on the user device includes inputting the translated touchscreen input to the local application to operate the computerized appliance.

3. A method as in claim 1 wherein the user device is a mobile apparatus that runs the local application; and
   wherein providing the translated touchscreen input to the local application running on the user device includes inputting the translated touchscreen input to the local application to control operation of the local application.

4. A method as in claim 1 wherein the set of intermediate devices includes a relay server which is constructed and arranged to pair different user devices with different desktop computer equipment; and
   wherein the method further comprises:
      prior to obtaining the communications signal, exchanging communications between the user device and the relay server, the relay server creating a communications session that pairs the user device to the desktop computer apparatus in response to the exchanged communications.

5. A method as in claim 4 wherein a first user residing at a first location possesses the user device; and
   wherein a second user residing at a second location manually operates the hardware mouse having the direct connection to the desktop computer apparatus to provide the mouse signal containing the mouse input during the created communications session, the first location being remote from the second location.

6. A method as in claim 5, further comprising:
   providing a copy of the touchscreen image of the local application from the user device to the desktop computer apparatus to enable the second user residing at the second location to view the copy of the touchscreen image while the second user manually operates the hardware mouse to provide the mouse signal containing the mouse input.

7. A method as in claim 1 wherein acquiring the communications signal from the desktop computer apparatus includes:
   obtaining, by the user device, wireless communications containing the mouse input.

8. A method as in claim 7 wherein the desktop computer apparatus includes a wireless transceiver; and
   wherein obtaining the wireless communications containing the mouse input includes:
      receiving, by the user device, the wireless communications directly from the wireless transceiver of the desktop computer apparatus.

9. A method as in claim 7 wherein a communications fabric, which is interconnected between the user device and the desktop computer apparatus, includes a wireless transceiver; and
　wherein obtaining the wireless communications containing the mouse input includes:
　　receiving, by the user device, the wireless communications from the wireless transceiver of the communications fabric which is interconnected between the user device and the desktop computer apparatus.

10. A method as in claim 1 wherein the set of intermediate devices of the external electronic equipment includes a server apparatus that stores an automated script containing the mouse input which indicates user operation of the hardware mouse; and
　wherein acquiring the communications signal includes:
　　acquiring the mouse input from the server apparatus in response to the server apparatus playing the automated script containing the mouse input, the mouse input originating from the desktop computer apparatus.

11. A method as in claim 1 wherein the desktop computer apparatus includes an external monitor constructed and arranged to render (i) a display area and (ii) a mouse pointer within the display area;
　wherein the mouse input includes mouse pointer locations that identify movement of the mouse pointer within the display area in response to movement of the hardware mouse over a surface; and
　wherein translating the mouse input into the translated touchscreen input includes mapping the mouse pointer locations into touchscreen coordinates that identify movement of a touchscreen pointer on the touchscreen.

12. A method as in claim 11 further comprising:
　while a user provides movement of the hardware mouse over the surface to move the mouse pointer within the display area rendered by the external monitor of the desktop computer apparatus, moving the touchscreen pointer on the touchscreen in response to the movement of the hardware mouse over the surface.

13. A method as in claim 1 wherein the mouse input includes a series of event groups having a first event group of detected mouse events and a second event group of detected mouse events; and wherein translating the mouse input into the translated touchscreen input includes:
　mapping the second event group of detected mouse events to a set of touchscreen events, and
　injecting the set of touchscreen events into the series of event groups in place of the second event group of detected mouse events while preserving the first event group of detected mouse events within the series of event groups to form the translated touchscreen input.

14. A method as in claim 1, further comprising:
　while the translated touchscreen input is provided to the local application running on the user device, providing real touchscreen input from the touchscreen to the local application in response to user touch input.

15. A method as in claim 14 wherein the mouse input originates from a first user; and
　wherein the real touchscreen input originates from a second user that is different from the first user.

16. A computer program product having a non-transitory computer readable medium that stores a set of instructions to control a local application running on a user device; the set of instructions, when carried out by the user device, causing the user device to perform a method of:
　receiving mouse input from external electronic equipment communicating with the user device, the user device having a touchscreen that displays a touchscreen image of the local application, the mouse input indicating user operation of a hardware mouse;
　translating the mouse input into translated touchscreen input; and
　providing the translated touchscreen input to the local application running on the user device to operate the local application;
　wherein the external electronic equipment includes a desktop computer apparatus;
　wherein the hardware mouse has a direct connection to the desktop computer apparatus and provides, through the direct connection, a mouse signal containing the mouse input to the desktop computer apparatus;
　wherein receiving the mouse input from the external electronic equipment includes acquiring a communications signal from the desktop computer apparatus, the communications signal (i) being different from the mouse signal and (ii) containing the mouse input;
　wherein the external electronic equipment further includes a set of intermediate devices which is interconnected between the user device and the desktop computer apparatus; and
　wherein acquiring the communications signal from the desktop computer apparatus includes indirectly obtaining the communications signal from the desktop computer apparatus through the set of intermediate devices.

17. A computer program product as in claim 16 wherein the set of intermediate devices includes a relay server which is constructed and arranged to pair different user devices with different desktop computer equipment; and
　wherein the method further comprises:
　　prior to obtaining the communications signal, exchanging communications between the user device and the relay server, the relay server pairing the user device to the desktop computer apparatus in response to the exchanged communications to create a communications session.

18. A computer program product as in claim 16, further comprising:
　while the translated touchscreen input is provided to the local application running on the user device, providing real touchscreen input from the touchscreen to the local application in response to user touch input; and
　wherein the mouse input originates from a first user; and
　wherein the real touchscreen input originates from a second user that is different from the first user.

19. A user device, comprising:
　a communications interface;
　a touchscreen which (i) receives real touchscreen input in response to user touch input and (ii) displays user output;
　memory which stores a local application; and
　control circuitry coupled to the communications interface, the touchscreen, and the memory; the memory storing instructions that, when carried out by the control circuitry, cause the control circuitry to:
　　receive mouse input from external electronic equipment communicating with the user device via the communications interface, the mouse input being received while the local application runs on the user device and while the touchscreen displays a touchscreen image of the local application, the mouse input indicating user operation of a hardware mouse, translate the mouse input into translated touchscreen input, and provide the translated touchscreen input to the local application running on the user device to operate the local application;

wherein the external electronic equipment includes a desktop computer apparatus;

wherein the hardware mouse has a direct connection to the desktop computer apparatus and provides, through the direct connection, a mouse signal containing the mouse input to the desktop computer apparatus;

wherein the control circuitry, when receiving the mouse input from the external electronic equipment, is constructed and arranged to acquire a communications signal from the desktop computer apparatus, the communications signal (i) being different from the mouse signal and (ii) containing the mouse input;

wherein the external electronic equipment further includes a set of intermediate devices which is interconnected between the user device and the desktop computer apparatus; and wherein the control circuitry, when acquiring the communications signal from the desktop computer apparatus, is constructed and arranged to indirectly obtain the communications signal from the desktop computer apparatus through the set of intermediate devices.

20. A user device as in claim 19 wherein the control circuitry is further constructed and arranged to, while the translated touchscreen input is provided to the local application running on the user device, provide real touchscreen input from the touchscreen to the local application in response to user touch input;

wherein the mouse input originates from a first user; and wherein the real touchscreen input originates from a second user that is different from the first user.

* * * * *